United States Patent [19]

Yasohara et al.

[11] Patent Number: 5,703,459

[45] Date of Patent: Dec. 30, 1997

[54] DRIVER FOR AN INDUCTION MOTOR

[75] Inventors: Masahiro Yasohara, Amagasaki; Yoshihiro Fujisaki, Matsubara; Kazuyuki Takada, Hirakata, all of Japan

[73] Assignee: Matsushita Electric Industrial Co., Ltd., Osaka, Japan

[21] Appl. No.: 610,826

[22] Filed: Mar. 5, 1996

[30] Foreign Application Priority Data

Jul. 12, 1995 [JP] Japan ................ 7-175753

[51] Int. Cl.⁶ ................ H02P 5/34; H02M 7/48
[52] U.S. Cl. ................ 318/808; 318/758; 318/803; 318/805
[58] Field of Search ................ 318/759–839, 318/138, 139; 290/4 R, 4 C; 363/39, 40, 41, 42, 43

[56] References Cited

U.S. PATENT DOCUMENTS

| | | | |
|---|---|---|---|
| 4,160,940 | 7/1979 | Wolf | 318/803 |
| 4,335,337 | 6/1982 | Okamatsu et al. | 318/52 |
| 4,477,761 | 10/1984 | Wolf | 318/800 |
| 4,721,861 | 1/1988 | Saito et al. | 290/4 R |
| 4,777,420 | 10/1988 | Dadpey et al. | 318/758 |

FOREIGN PATENT DOCUMENTS 63140688  6/1988  Japan.

*Primary Examiner*—Paul Ip
*Attorney, Agent, or Firm*—Watson Cole Stevens Davis, P.L.L.C.

[57] ABSTRACT

A driver for an induction motor includes a voltage limiter which limits an upper limit value of an output voltage from an invertor circuit in accordance with an output frequency command, a lowest frequency limiter which limits a lower limit of an output frequency from the invertor circuit, a forward rotation limiter which outputs a first power supply interruption signal when the output frequency from the invertor circuit reaches the upper limit, a reverse rotation limiter which outputs a second power supply interruption signal when a reverse rotational speed of the motor reaches a reverse rotation limit level, and a low-speed overload detector which outputs a third power supply interruption signal when a state in which the second power supply interruption signal is not output continues in a low speed abnormality state.

6 Claims, 12 Drawing Sheets

DRIVER FOR AN INDUCTION MOTOR

BACKGROUND OF THE INVENTION

The present invention relates to a driver for an induction motor used as a fan motor, for example, for driving an outdoor fan of an air conditioner.

Recently, induction motors have been used widely as motors which drive outdoor fans of air conditioners.

Control techniques for an induction motor have remarkably advanced so that the induction motor can be driven with a variable voltage/frequency to control the rotational speed thereof freely, using a pulse width modulation (PWM) invertor circuit.

Application of an induction motor which is finely controlled using such control techniques to a motor for driving an outdoor fan of an air conditioner has prevailed.

For example, as shown in FIG. 14, a driver for an induction motor which is driven with a variable voltage/ variable frequency to control the rotational speed thereof freely, using a PWM invertor circuit, includes a three-phase induction motor 1001 to which a fan 1002 is connected, an invertor circuit 1003 which supplies power to the induction motor 1001 with a three-phase alternating current voltage based on an output voltage command signal V and an output frequency command signal F, an alternating current power source 1006, a rectifier circuit 1007 and a smoothing capacitor 1008 which rectify and smooth the output from the alternating current power source 1006 and applies the resulting direct current voltage to the invertor circuit 1003, an output voltage command means 1004 which applies the output voltage command signal V to the invertor circuit 1003, a voltage/frequency converter means 1005 which uniquely defines the output frequency command signal F in accordance with a voltage command signal output from the output voltage command means 1004 and which applies the defined output frequency command signal to the invertor circuit 1003 to thereby drive the three-phase induction motor 1001 with a variable voltage/variable frequency in accordance with a voltage command signal from the output voltage command means 1004 and a frequency command signal defined uniquely by the voltage/frequency converter means 1005 in accordance with the voltage command signal from the output voltage command means 1004.

Such technique is referred to as VVVF control, which is generally well known as a method of driving the induction motor at a changing speed.

However, when the induction motor is driven with the control techniques and applied to an outdoor fan of an air conditioner and the fan is forcibly driven externally with a strong wind force, for example, based on a typhoon, many inconveniences would arise.

For example, when a reverse wind rises which drives the fan 1002 in a direction reverse to the driving direction of the induction motor 1001, the induction motor 1001 would be driven under overload and hence its driving current would increase.

When the driving current for the induction motor 1001 increases, the quantity of heat produced by the induction motor 1001 and the invertor circuit 1003 which supplies power to the induction motor 1001 would increase and those devices may be broken as the case may be.

In order to prevent the production of heat and breakage of the induction motor 1001 and invertor circuit 1003, a method of sensing the overheating or overcurrent of those elements, interrupting the power supply to those elements and tripping those elements such that those elements will not be restored by themselves could be considered. However, a fan motor which frequently trips and stops each time a typhoon rises is difficult to employ and apply as a one which drives the outdoor fan of the air conditioner.

When a favorable wind rises which drives the fan 1002 in a favorable direction which aids the driving of the induction motor 1001, the induction motor 1001 is forcibly accelerated. When the rotational speed of the induction motor 1001 exceeds a rotational speed corresponding to the output frequency from the invertor circuit 1003, the induction motor 1001 acts as a generator to thereby produce a regenerative power.

The regenerative power produced by the conduction motor 1001 is reversely supplied to the invertor circuit 1003. As a result, the voltage across the terminals of the smoothing capacitor 1008 is increased.

As a result, the capacitor 1008 and the invertor circuit 1003 are put in an overvoltage state and hence would be broken.

In order to prevent such overvoltage breakage, provision of a regenerative power processor which absorbs the regenerative power of the induction motor 1001 and suppresses an increase in its voltage could be considered. However, the regenerative power processor requires components which can withstand high power. Thus, there is a demerit that the processor being large-sized and expensive can not be avoided.

SUMMARY OF THE INVENTION

The present invention resolves the above problems. It is an object of the present invention to provide a small-sized inexpensive driver for an induction motor which beforehand prevents overload and overcurrent from being produced to be difficult to trip and prevent the generation of a regenerative power beforehand even when a strong preferable or reverse wind rises, for example, due to a typhoon.

In order to achieve the above object, according to the present invention, first, there is provided a driver for an induction motor comprising:

speed sensing means for sensing the rotational speed of the induction motor;

an invertor circuit for supplying power to the induction motor by an alternating current voltage based on an output voltage command signal and an output frequency command signal;

output voltage command means for giving the output voltage command signal to the invertor circuit;

output frequency command means for applying as the output frequency command signal to the invertor circuit the sum of a predetermined slip frequency and a frequency signal depending on the rotational speed of the induction motor and output from the speed sensing means, the driver being driven under slip frequency control, voltage limit level setting means for setting a upper limit value of the output voltage from the invertor circuit in accordance with an output signal from the output frequency command means or an output signal from the speed sensing means; and voltage limiter means for limiting the output signal from the output voltage command means in accordance with a set value set by the voltage limit level setting means to limit the upper limit of the output voltage from the invertor circuit, wherein a set level for the upper limit of the output voltage from the invertor circuit is changed in correspondence to a change in the output frequency from the invertor circuit.

Second, the driver may include lowest-frequency limiter means for limiting the output signal from the output frequency command means such that the lower limit of the output frequency from the invertor circuit is not less than a preset lowest frequency, wherein the lowest frequency becomes the output frequency from the invertor circuit when the output frequency from the invertor circuit decreases to the lowest frequency of the lowest frequency limiter means.

Third, the driver may include forward rotation limiter means for sensing whether the output frequency from said invertor circuit has reached a preset maximum frequency limit level and if so, for outputting a first power supply interruption signal; and reverse rotation limiter means for detecting whether the reverse rotation speed of the induction motor has reached a preset reverse rotation limit level and if so, for outputting a second power supply interruption signal;

wherein power supply to the induction motor is interrupted when either said forward rotation limiter means outputs the first power supply interruption signal or said reverse rotation limiter means outputs the second power supply interruption signal.

Fourth, the driver may include low-speed abnormality detection means for detecting whether the rotational speed of the induction motor is below a preset low-speed abnormality detection level and if so, for outputting a low-speed abnormality signal; and low-speed overload detection means including the low-speed abnormality detection means for latching and outputting a third power supply interruption signal when a state in which the low-speed abnormality detection means outputs the low-speed abnormality signal and the reverse rotation limiter means outputs no second power supply interruption signal continues for a predetermined time duration;

wherein power supply to the induction motor is interrupted when said forward rotation limiter means outputs the first power supply interruption signal or said reverse rotation limiter means outputs the second power supply interruption signal or when said low-speed overload detection means outputs the third power supply interruption signal.

The driver for an induction motor provided by the above composition is small and inexpensive, and adapted to the driving of an outdoor fan of an air conditioner which prevents the occurrence and generation of an overload, overcurrent and regenerative power beforehand, causes no care for breakage, and difficult to trip.

DESCRIPTION OF THE PREFERRED EMBODIMENTS (Embodiment 1)

Figure 1:
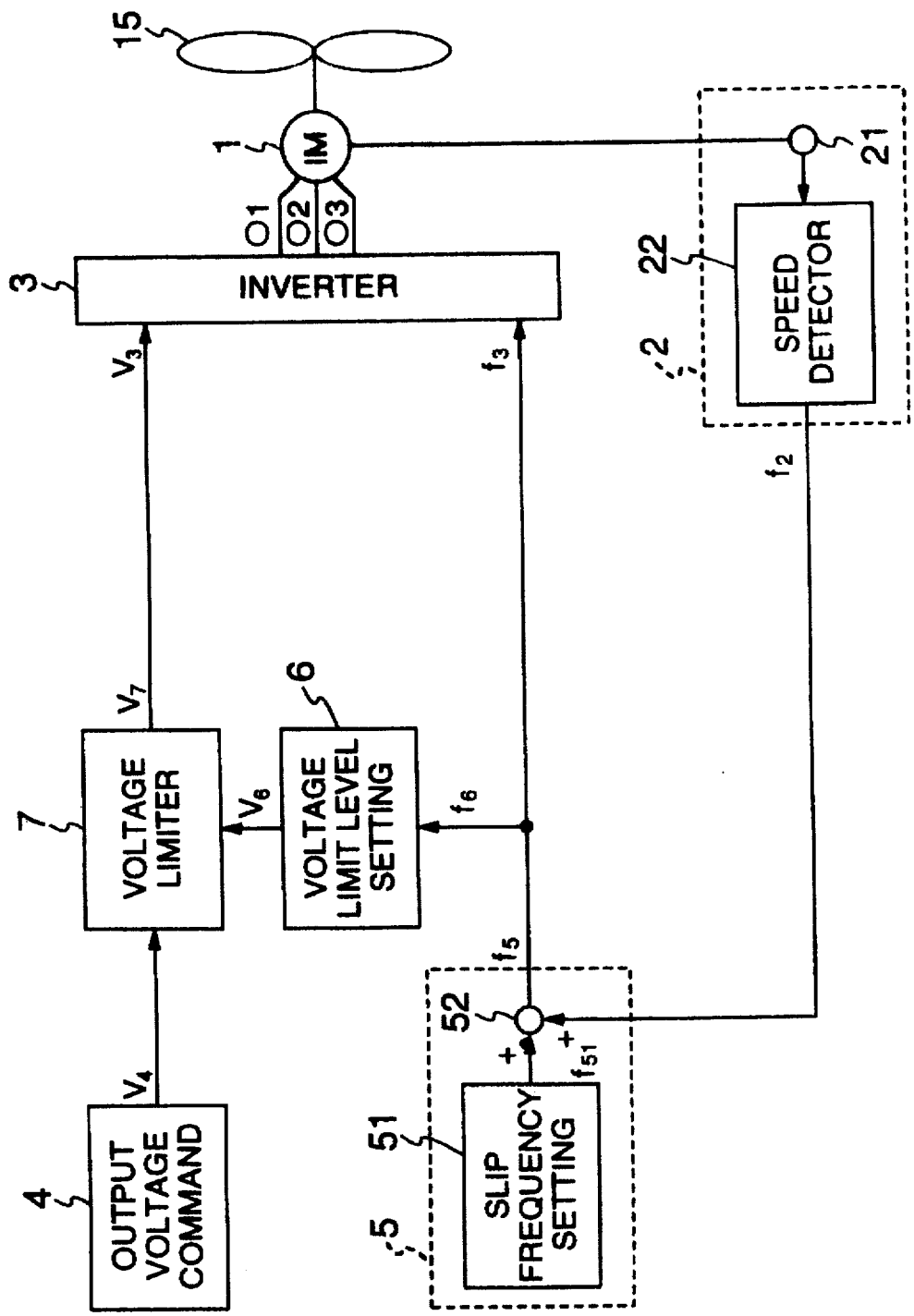
FIG. 1 shows a first embodiment of a driver for an induction motor according to the present invention.

The first embodiment 1 of the present invention will be described next with reference to the accompanying drawings. FIG. 1 shows the first embodiment of a driver for an induction motor according to the present invention. Reference numeral 1 denotes an induction motor, to which output shaft a fan 15 is directly connected.

Reference numeral 2 denotes speed sensing means which includes a rotational speed sensor 21 which senses the rotational speed of the motor 1 and a speed detector 22 which processes the output signal from the sensor 21 and provides an output signal $f_2$, which is a speed detection signal which includes data on the rotational direction of the motor 1. The rotational speed sensor 21 and the speed sensor 22 are arranged such that when, for example, the motor 1 rotates in a forward direction, the speed detection signal takes a positive value proportional to the rotational speed of the motor 1 while when the motor 1 rotates backward, the speed detection signal takes a negative value proportional to the rotational speed of the motor 1.

Reference numeral 3 denotes an invertor circuit which is constructed such that it rectifies, for example, a commercial alternating current voltage (not shown) and smoothes the resulting output into a direct current voltage, power-converts the direct current voltage to three-phase alternating current voltages $O_1$, $O_2$ and $O_3$ on the basis of an output voltage command signal $V_3$ and an output frequency command signal $f_3$ and supplies to the motor 1 the three-phase alternating current voltages $O_1$, $O_2$, $O_3$, which have an electrical phase difference of 120 degrees for each other with their output crest voltage values corresponding to the output voltage command signal $V_3$ and their output frequency corresponding to the output frequency command signal $f_3$.

Reference numeral 5 denotes an output frequency command means which includes slip frequency setting means 51 and an adder 52 which adds the output signal $f_{s1}$ from the slip frequency setting means 51 and an output signal $f_2$ from the speed sensing means 2 with the output of the adder 52 being provided as an output signal $f_5$ from the output frequency command means 5.

The output signal $f_5$ from the output frequency command means 5 is input as the output frequency command signal $f_3$ to the invertor circuit 3 and also input as an input signal $f_6$ to voltage limit level setting means 6.

The output signal $V_6$ from the voltage limit level setting means 6 is input as a limit value setting signal to voltage limiter means 7.

Reference numeral 4 denotes output voltage command means whose output signal $V_4$ is limited by the voltage limiter means 7 and input as the output voltage command signal $V_3$ to the invertor circuit 3.

When the output signal $V_4$ is less than the output signal $V_6$, the voltage limiter means 7 outputs the output signal $V_4$ as an output signal $V_7$. When the output signal $V_7$ exceeds the output signal $V_6$, the voltage limiter means 7 outputs the output signal $V_6$ as the output signal $V_7$. The output signal $V_7$ is input as the output voltage command signal $V_3$ to the invertor circuit 3.

The operation of the driver for the induction motor, constructed as described above, will be described next.

Figure 2:
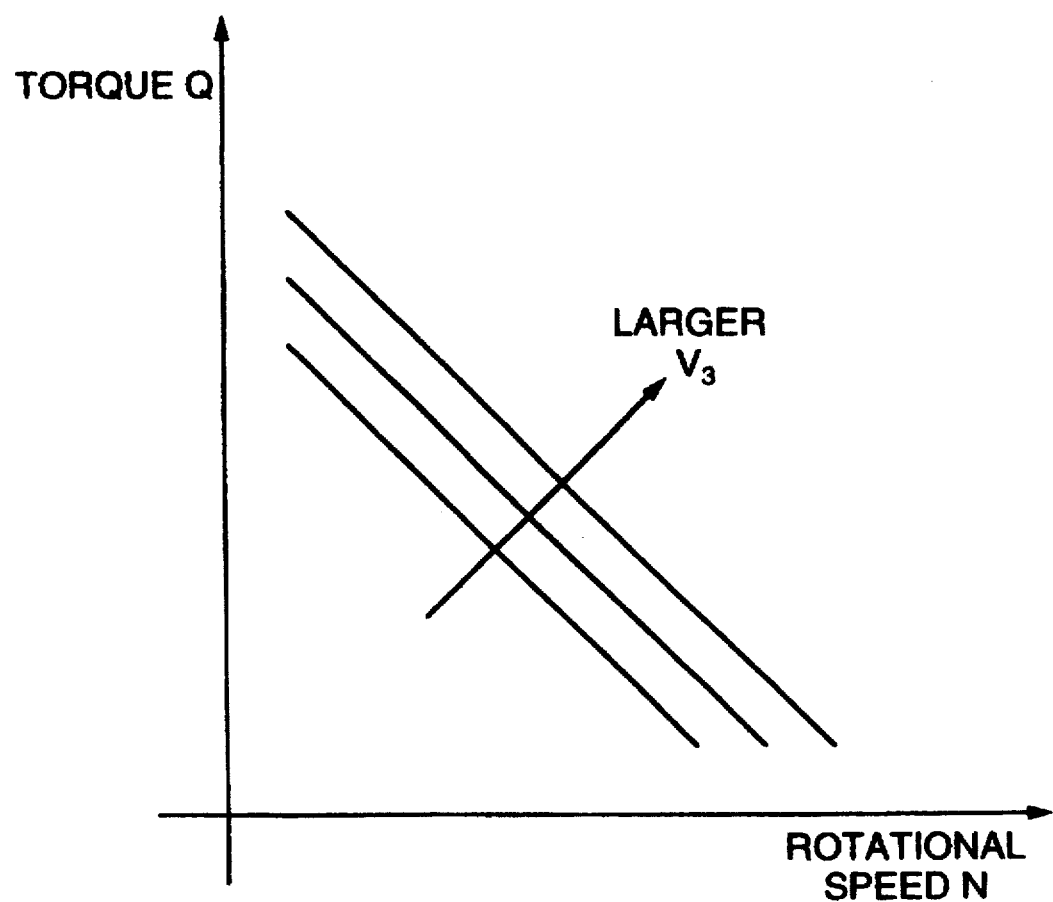
FIG. 2 shows a rotational speed-torque characteristic of the induction motor based on slip frequency control in the present invention.

As shown in FIG. 1, since the frequency signal $f_5$ which includes the sum of the frequency signal $f_2$ depending on the rotational speed of the motor 1 output from the speed sensing means 2 and a predetermined slip frequency signal $f_{s1}$ output from the slip frequency setting means 51 is input as an output frequency command signal $f_3$ to the invertor circuit 3, the rotational speed-output torque characteristic (N-T characteristic) of the motor 1 is substantially the same as that of a direct current motor, as shown in FIG. 2. Thus, the rotational speed or torque control of the induction motor is controllable in accordance with the output voltage command signal $V_3$ to thereby realize the drive of the motor at very high efficiency.

Such techniques are generally known as slip frequency control. The operation of the induction motor, which is driven under slip frequency control, for example as a drive motor for an output fan of an air conditioner will be described with reference to FIG. 3.

Figure 3:
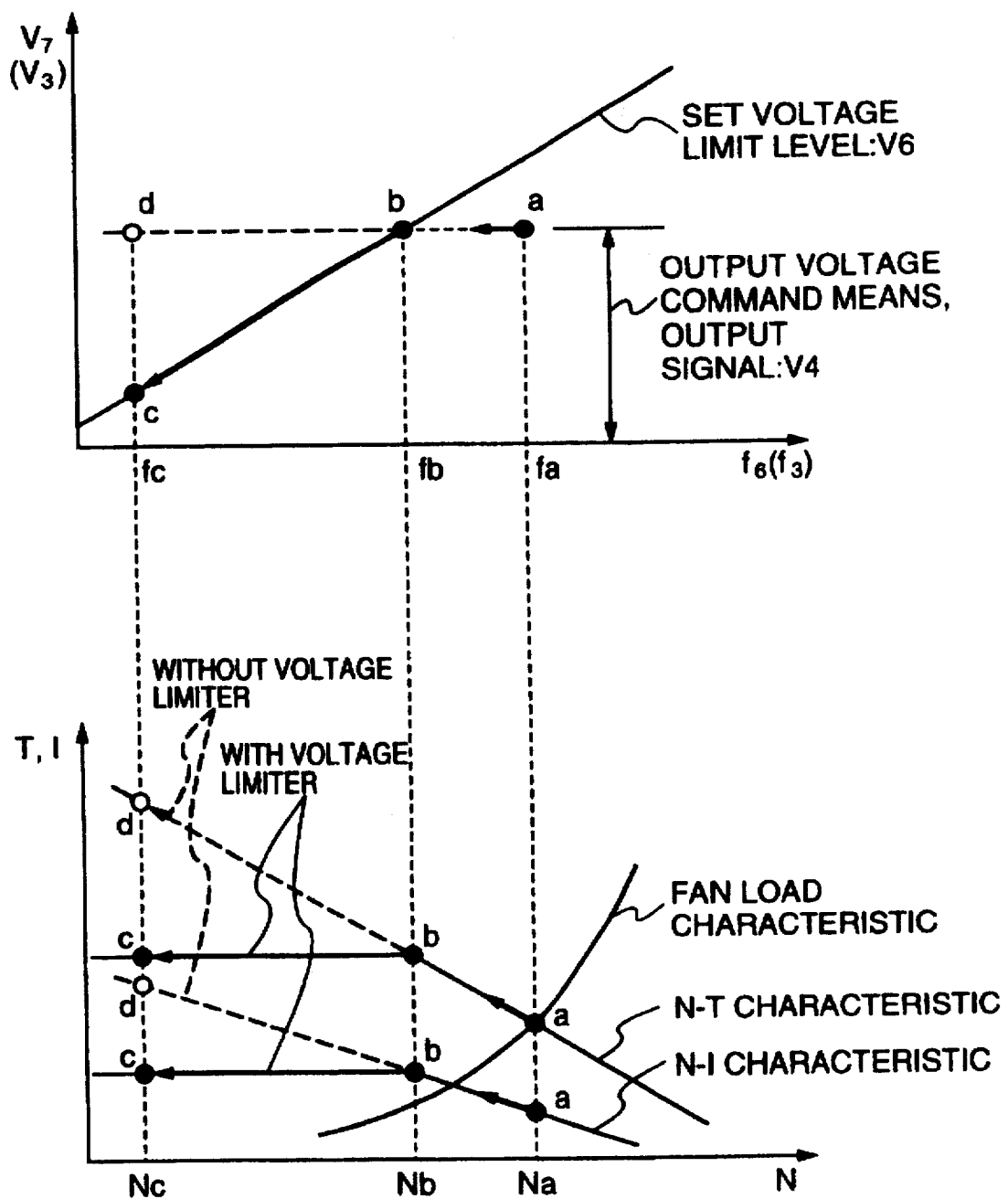
FIGS. 3 and 4 illustrate the operation of the first embodiment.

A lower half of FIG. 3 shows the rotational speed vs. output torque characteristic (N-T characteristic) of the motor and its rotational speed vs. drive current characteristic (N-I characteristic) of the motor 1 and a load characteristic of a fan 15 with the output signal $V_4$ from the output voltage command means 4 being constant.

FIG. 3 shows the characteristic in which the fan load increases with the rotational speed of the motor. When the fan 15 is driven by the motor 1, the rotational speed of the fan 15 is stabilized at a point a where the output torque of the motor 1 balances with the load torque of the fan 15.

When a strong reverse wind, for example, due to a typhoon, blows against the fan 15 in the stabilized rotational speed point a and a reverse drive torque is forcibly applied to the motor 1, its rotational speed decreases in accordance with the N-T and N-I characteristics and the driving current increases until the operational point shifts from the point a to a point b.

When a stronger reverse wind blows against the fan 15 after the operation point has moved to the point b, the rotational speed of the motor 1 further decreases. At this time, if the output signal $V_4$ of the output voltage command means 4 is input as an output voltage command signal $V_3$ from the invertor circuit 3 without being limited, the operation point moves from the point b to a point d, and thus, the driving current of the motor 1 further increases with its decreasing rotational speed.

When the driving current increases, problems would arise which are similar to those arising when the induction motor is driven on the basis of VVVF control illustrated in the above prior art. For example, as the driving current increases, the quantity of heat produced by the motor 1 and the invertor circuit 3 would increase to thereby break those devices possibly, or power semiconductor parts which constitute the invertor circuit 3 would require to be large-sized elements having large power capacities to prevent breakage of the invertor circuit. When a strong wind rises frequently in a state where a trip mechanism is arranged to operate for protection from the overcurrent, the outdoor fan motor of the air conditioner would correspondingly stop frequently and be difficult to use as such.

In order to avoid such problems, in the present embodiment, voltage limit level setting means 6 and voltage limiter means 7 are provided.

The operation of the voltage limit level setting means 6 and the voltage limiter means 7 will be described below. The voltage limit level setting means 6 provides the voltage limiter means 7 with an output signal V6 which includes a setting signal to set the upper limit value of the crest voltage values of three-phase alternating current voltages $O_1$, $O_2$ and $O_3$ which are the output voltages from the invertor circuit 3.

More specifically, the output signal $V_6$ is changed depending on the output signal $f_5$ from the output frequency command means 5 or an input signal $f_6$ to the voltage limit level setting means 6, and the output signal $V_6$ decreases (or increases) as the input signal $f_6$ decreases (or increases).

The voltage limiter means 7 limits the output signal $V_4$ from the output voltage command means 4 on the basis of the output signal $V_6$ from the voltage limit level setting means 6 so as to limit the upper limit of the crest voltage values of the three-phase alternating current voltages $O_1$, $O_2$ and $O_3$ which are the output voltages from the invertor circuit 3.

More specifically, when the output signal $V_4$ from the output voltage command means 4 is lower than the output signal $V_6$ from the voltage limit level setting means 6, the output signal $V_4$ is output as the output signal $V_7$ from the voltage limiter means 7 or as the output voltage command signal $V_3$ to the invertor circuit 3. The motor 1 operates on the basis of the output signal $V_4$ from the output voltage command means 4. When the output signal $V_4$ from the output voltage command means 4 exceeds the output signal $V_6$ from the voltage limit level setting means 6, the output signal $V_6$ is output as the output signal $V_7$ from the voltage limiter means 7 or as the output voltage command signal $V_3$ to the invertor circuit 3. The motor 1 is driven on the basis of the output signal $V_6$ from the voltage limit level setting means 6.

When the output signal $V_4$ exceeds the output signal $V_6$, the output voltage command signal $V_3$ to the invertor circuit 3 decreases (or increases) depending on a decrease (or increase) in the output signal $f_5$ from the output frequency command means 5.

The operation of the driver will be described next with reference to FIG. 3 when a strong reverse wind, for example, based on a typhoon, blows against the fan 15 to thereby forcibly apply a reverse drive torque to the motor 1 in the embodiment where the voltage limit level setting means 6, and the voltage limiter means 7 which operate as described above are provided.

First, the operational point a shows that the output signal $V_4$ from the output voltage command means 4 is below than the output signal $V_6$ from the voltage limit level setting means 6, that the motor 1 is driven in accordance with the output signal $V_4$, and that the rotational speed Na has been stabilized such that the output torque of the motor 1 balances with the load torque of the fan 15.

When a strong reverse wind blows against the fan 15 in the state of the operational point a, the rotational speed of the motor 1 decreases from the operational point a to reach an operational point b where the rotational speed becomes Nb.

When a stronger reverse wind blows, the rotational speed of the motor further decreases to become Nc at which time the output frequency command signal $f_3$ from the invertor circuit 3 also decreases with the rotational speed Nb to fc and accordingly the output signal $V_6$ from the voltage limit level setting means 6 decreases.

At this time, the output signal $V_4$ from the output voltage command means 4 exceeds the output signal $V_6$ and the output signal $V_6$ from the voltage limit level setting means 6 is applied as the output voltage command signal $V_3$ to the invertor circuit 3.

Thus, the crest voltage values of the three-phase alternating current voltages $O_1$, $O_2$ and $O_3$ supplied to the motor 1 are suppressed and an increase in the driving current is suppressed, as shown by the operational point c of FIG. 3.

As described above, according to the present embodiment, provision of the voltage limit level setting means 6 and the voltage limiter means 7 serves to suppress an increase in the driving current even when the motor is forcibly driven externally by a strong reverse wind, for example, based on a typhoon. Thus, the quantity of heat produced by the motor 1 and the invertor circuit 3 is small, and small power semiconductor elements having small power capacities may be used as parts which constitute the invertor circuit 3. A driver for the induction motor optimal to the drive of the outdoor fan of the air conditioner is realized which is free from a stop due to an overcurrent trip which would otherwise occur each time a strong wind rises.

The N-T and N-I characteristics of the motor 1 may be changed depending on the input-output characteristic of the voltage limit level setting means 6 in the region where the motor 1 is driven on the basis of the Output signal $V_6$ from the voltage limit level setting means 6, that is, in the region of the rotational speed lower than the operational point b of FIG. 3.

Figure 4:
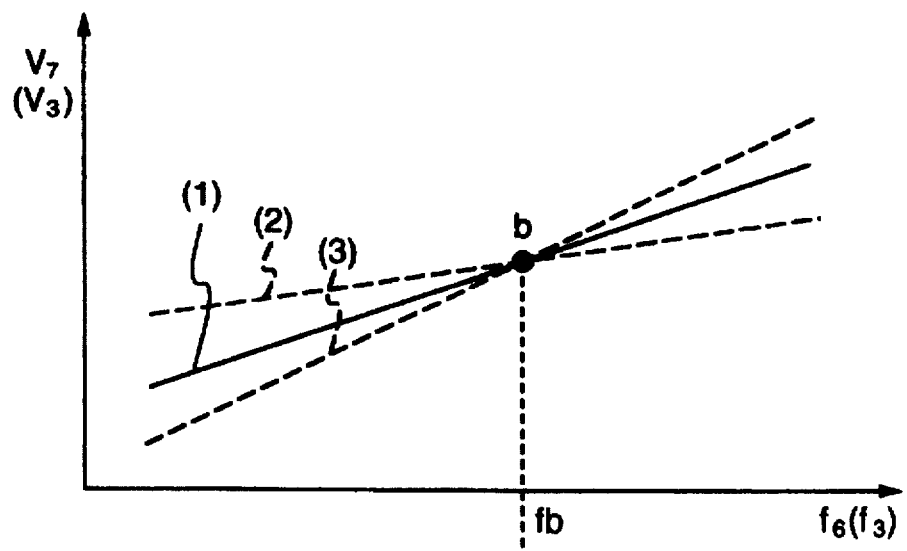
Figure 4:
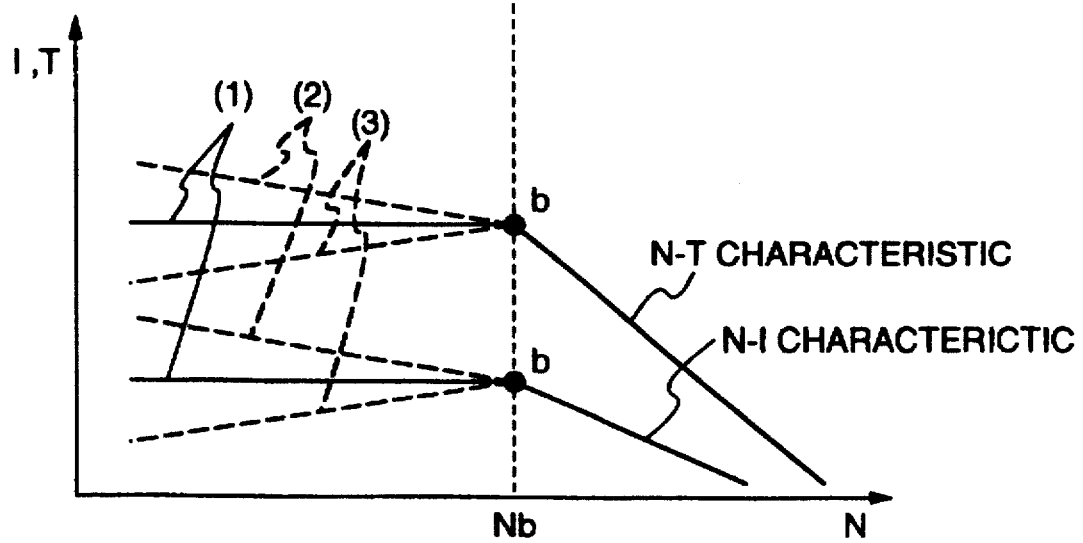

That is, as shown in FIG. 4, by changing the ratio in change of the input signal $f_6$ to the output signal $V_6$ of the voltage limit level setting means 6, as shown by (1), (2) and (3) of FIG. 4, the N-T and N-I characteristics of the motor 1 are changed correspondingly like (1), (2) and (3).

Thus, the characteristics of the motor are electrically adjustable and the same motor is easily applicable electrically in various states of use.

The operational point b of FIGS. 3 or 4 is optionally settable, for example, by changing the gradient of the input-output ($f_6$-$V_6$) characteristic of the voltage limit level setting means 6, of course.

The input-output ($F_6$-$V_6$) characteristic of the voltage limit level setting means 6 is not necessarily linear, as shown in FIG. 3 or 4, but may be any continuous or discontinuous curved or straight line.

While in the embodiment the output signal $f_5$ from the output frequency command means 5 has been illustrated as being input as the input signal $f_6$ to the voltage limit level setting means 6, the output signal $f_2$ from the speed sensing means 2 which is present before the slip frequency $f_{S1}$ is added may be input as an input signal $f_6$ to the voltage limit level setting means 6 to realize a driver for the induction motor which produces effects similar to those mentioned above.

(Embodiment 2)

Figure 5:
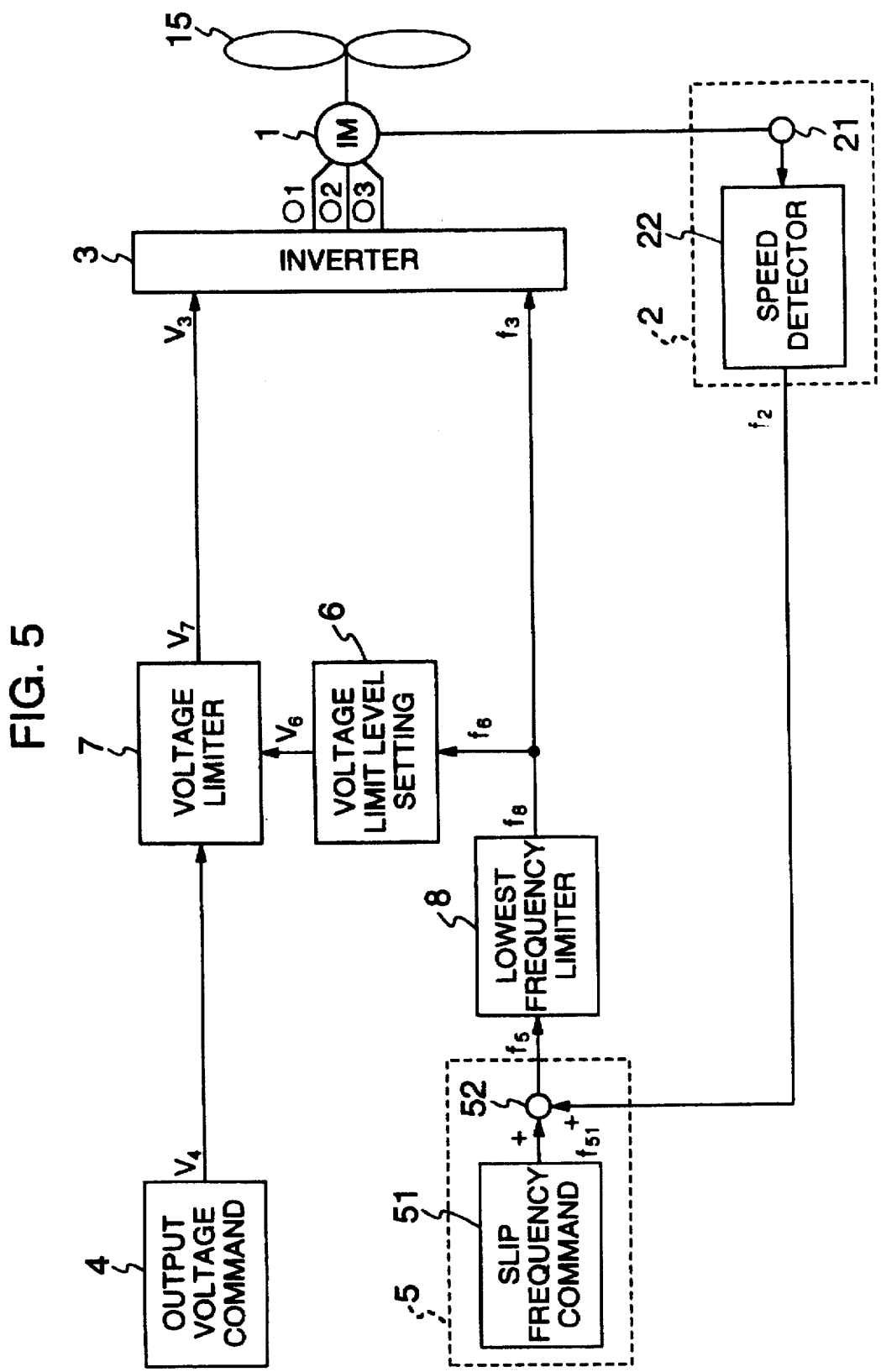
FIG. 5 shows a second embodiment of the driver for an induction motor according to the present invention.

FIG. 5 shows a second embodiment of the driver for the induction motor according to the present invention. In FIG. 5, lowest frequency limiter means 8 is provided to which the output signal $f_5$ from the output frequency command means 5 is input and the output signal $f_8$ from the lowest frequency limiter means 8 is input as an output frequency command signal $f_3$ to the invertor circuit 3 and also input as an input signal $f_6$ to the voltage limit level setting means 6. The remainder of the structure of the second embodiment is the same as the corresponding structure portion of the first embodiment.

The driver for the induction motor thus constructed will be described next. The components of the second embodiment excluding the lowest frequency limiter means 8 are the same in operation as the corresponding ones of the first embodiment as already described above. The same reference numeral denotes the same functional elements in the second and first embodiments, and further description thereof will be omitted.

In FIG. 5, the motor 1 is driven by slip frequency control and an increase in the driving current of the driver is suppressed, as shown in FIG. 3, by the voltage limit level setting means 6 and the voltage limiter means 7 even when the motor is forcibly driven externally by a strong reverse wind, for example, based on a typhoon, as described concerning the first embodiment.

However, when a stronger reverse wind rises and the rotational direction of the motor 1 is forcibly reversed, the following problems would arise.

Figure 6:
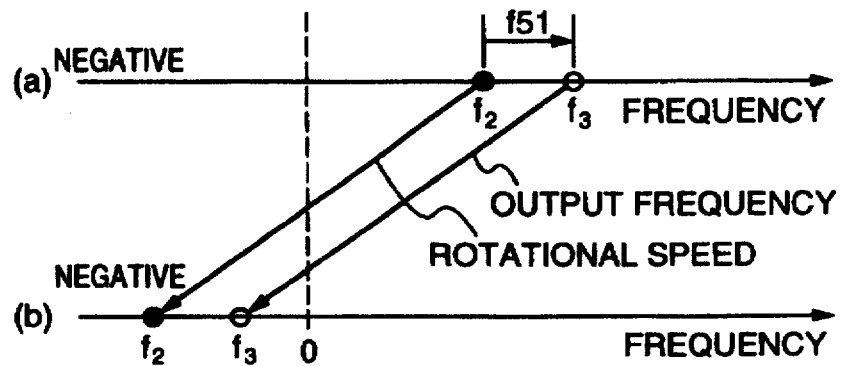
FIGS. 6 and 7 illustrate the operation of the second embodiment.

As shown in line (a) of FIG. 6, when the motor 1 is driven under slip frequency control, the output frequency or output frequency command signal $f_3$ from the invertor circuit 3 is controlled so as to be the sum of a frequency corresponding to the rotational speed of the motor 1, that is, the output signal $f_2$ from the speed sensing means 2, and the slip frequency $f_{S1}$.

More specifically, the frequencies $f_3$ and $f_2$ are always controlled such that the difference between the frequencies $f_3$ and $f_2$ is the slip frequency $f_{S1}$. Under such conditions, when a reverse wind rises which is so strong that the rotational direction of the motor 1 is reversed, a state shown in line (b) of FIG. 6 occurs because the frequencies $f_2$ and $f_3$ are put under slip frequency control.

The frequencies $f_2$ and $f_3$ are both in the same negative direction and the frequency $f_2$ is larger by $f_{S1}$ than the frequency $f_3$.

In the induction motor, when the rotational direction of the rotor (corresponding to the direction of $f_2$) and the rotational direction of the field system (corresponding to the direction of $f_3$) are the same for the characteristic of the motor and the rotational speed of the rotor (corresponding to the magnitude of $f_2$) exceeds the rotational speed of the field system (corresponding to the magnitude of $f_3$), the induction motor acts as a generator to thereby produce a regenerative power.

Thus, when the induction motor 1 is driven in the state shown in line (b) of FIG. 6, the motor 1 generates a regenerative power. This power is reversely supplied to the invertor circuit 3, so that the invertor circuit 3 may possibly be broken by an overvoltage or an overcurrent.

In order to avoid such problem, the lowest-frequency limiter means 8 is provided in the second embodiment. The operation of the lowest-frequency limiter means 8 will be described next. The lowest-frequency limiter means 8 limits the output signal $f_5$ of the output frequency command means 5 and the lower limit of the output frequency of the three-phase alternating current voltage $O_1$, $O_2$ and $O_3$ which are the output voltage of the invertor circuit 3.

More specifically, when the output signal $f_5$ from the frequency command means 5 is higher than the lowest-frequency limit level $f_{min}$ set in the lowest-frequency limiter means 8, the output frequency $f_5$ is output as the output signal $f_8$ from the lowest-frequency limiter means 8 or as the output frequency command signal $f_3$ to the invertor circuit 3. When the output signal $f_5$ from the output frequency command means 5 is lower than the lowest frequency limit level $f_{min}$, the lowest-frequency limit level $f_{min}$ is output as the output signal $f_8$ from the lowest-frequency limiter means 8 or as the output frequency command signal $f_3$ to the invertor circuit 3.

The operation of the driver performed when a reverse wind strong enough to reverse the rotational direction of the motor 1 rises in the present embodiment which includes the lowest frequency limiter means 8 operating as mentioned above will be described next with reference to FIG. 7.

Figure 7:
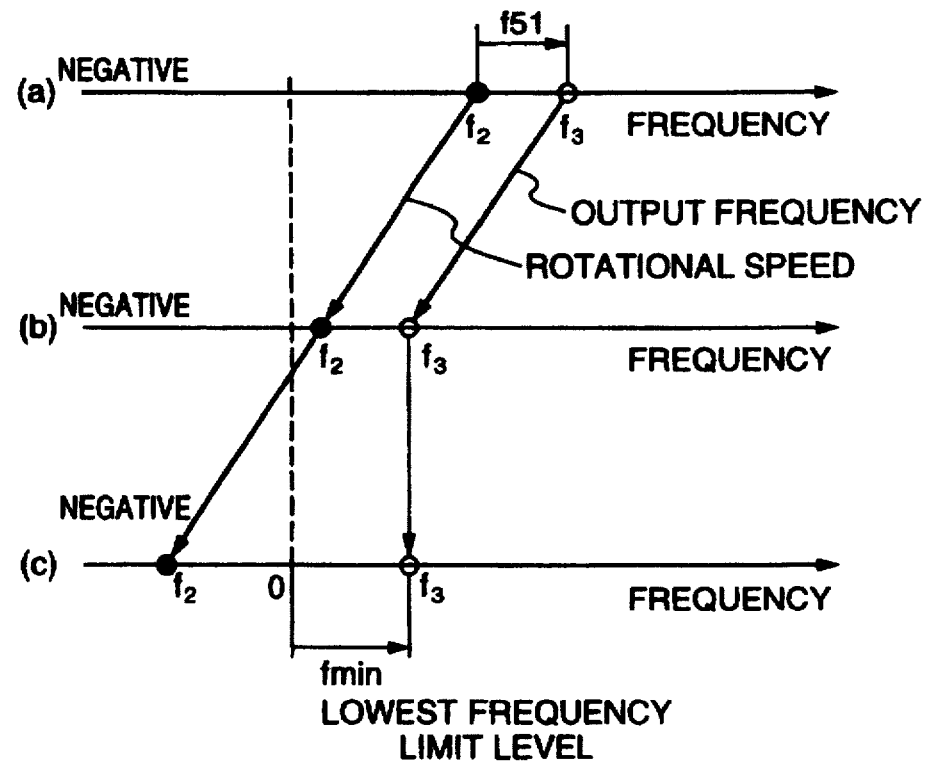

Line(a) of FIG. 7 shows a state present before the strong reverse wind rises. The frequency $f_3$ corresponding to the output frequency of the invertor circuit 3 is slip frequency-controlled so as to be the sum of the slip frequency $f_{s1}$ and the frequency $f_2$ corresponding to the rotational speed of the motor 1.

When a strong reverse wind rises in the state shown in line (a) of FIG. 7, a state shown in line (b) of FIG. 7 occurs.

Line (b) of FIG. 7 shows the instant where $f_3$ is the same as the lowest frequency limit level $f_{min}$.

When a stronger wind rises in the state of line (b) of FIG. 7 and the rotational direction of the motor 1 is reversed, a state shown in line (c) of FIG. 7 occurs.

In the state of line (c) FIG. 7, the output signal $f_5$ ($=f_2+f_{s1}$) from the output frequency command means 5 is lower than the lowest frequency limit level $f_{min}$ and the lowest frequency limiter means 8 operates so as to provide its output as $f_{min}$ or as the output frequency command signal $f_3$ to the invertor circuit 3.

At this time, the induction motor 1 is driven at a fixed frequency having a positive value based on the lowest frequency limit level $f_{min}$ and its rotational direction is reversed by the strong reverse wind. Thus, even when $f_2$ takes a negative value, both $f_2$ and $f_3$ are not in the same negative direction to thereby prevent the generation of a regenerative power.

As described above, according to the present embodiment, even when the induction motor 1 is forcibly driven externally by a strong (reverse) wind, for example, based on a typhoon, and receives a strong wind such as reverses the rotational direction of the motor, the motor 1 is prevented from generating a regenerative power due to the provision of the lowest frequency limiter means 8 to thereby realize the driver for the induction motor which is free from breakage which would otherwise be caused by reverse supply of power to the invertor circuit 3.

(Embodiment 3)

Figure 8:
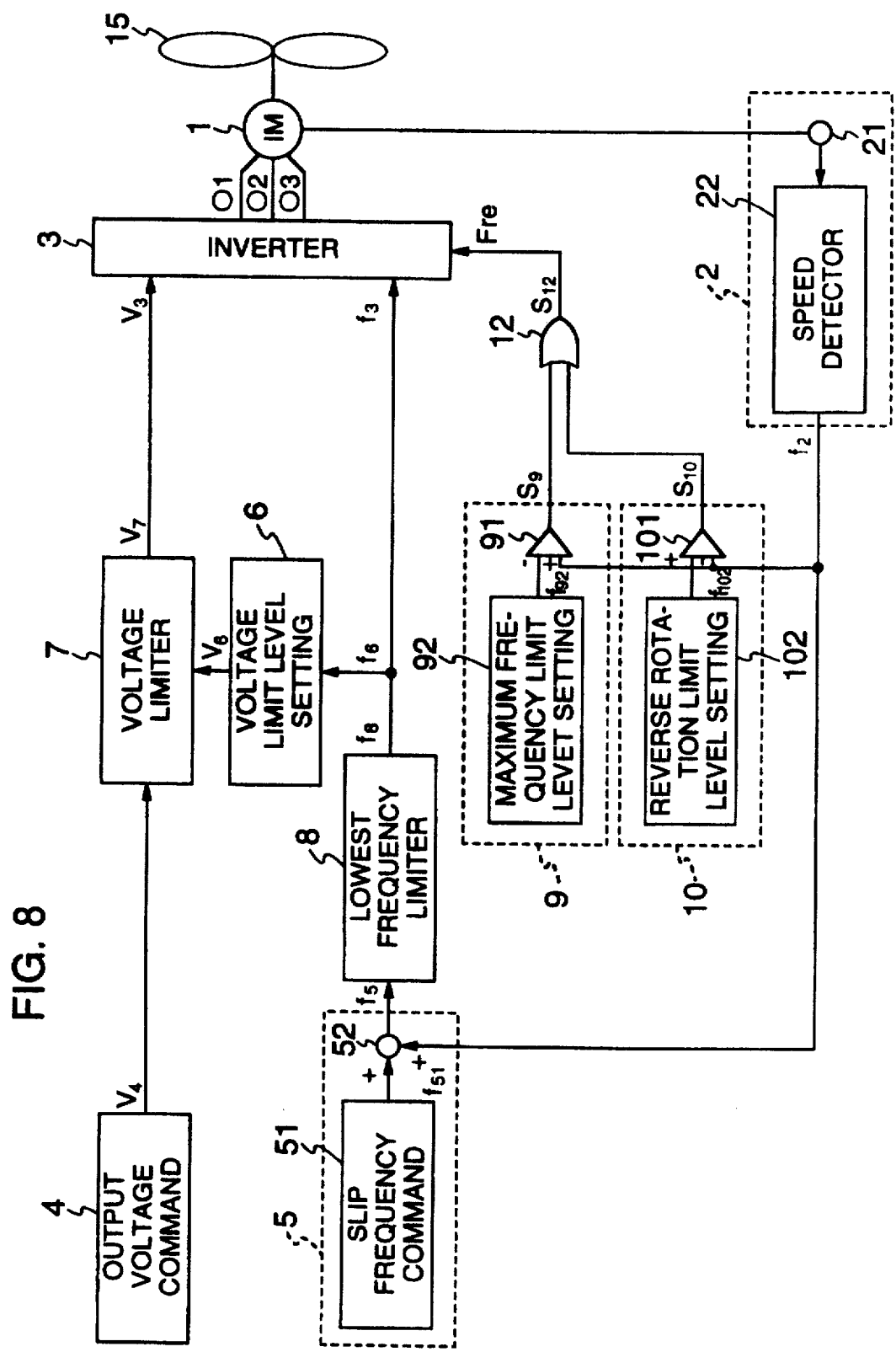
FIG. 8 shows a third embodiment of the driver for an induction motor according to the present invention.

FIG. 8 shows a third embodiment of the driver for the induction motor according to the present invention. In FIG. 8, reference numeral 9 denotes forward rotation limiter means which includes a maximum frequency limit level setting means 92 and a hysteresised comparator 91 which compares the output signal $f_{92}$ from the maximum frequency limit level setting level 92 and the output signal $f_2$ from the speed sensing means 2. When the output signal $f_2$ exceeds the output signal $f_{92}$, the forward rotation limiter means 9 outputs a high level signal output from the hysteresised comparator 91 as a first power supply interruption signal $S_9$.

Reference numeral 10 denotes reverse rotation limiter means which includes reverse rotation limit level setting means 102 and a comparator 101 which compares the output signal $f_{102}$ from the reverse rotation limit level setting means 102 and the output signal $f_2$ from the speed sensing means 2. When the output signal $f_2$ is lower than the output signal $f_{102}$, the reverse rotation limiter means 102 outputs a high level output from the comparator 101 as a second power supply interruption signal $S_{10}$.

The inverter circuit 3 is capable of electrically opening/closing the connection between the invertor circuit 3 and the induction motor 1 in accordance with a free-run command signal Fre. For example, when the Fre signal is low, the outputs $O_1$, $O_2$ and $O_3$ of the invertor circuit 3 are electrically connected with the motor 1 while when the Fre signal is high, the connection between the outputs $O_1$, $O_2$ and $O_3$ of the invertor circuit 3 and the motor 1 is released electrically.

Reference numeral 12 denotes an AND gate which performs an AND operation between the first power supply interruption signal $S_9$ and the second power supply interruption signal $S_{10}$.

The output signal $S_{12}$ from the AND gate 12 is input as the free run signal Fre to the invertor circuit 3. The remaining structure of the third embodiment is similar to the corresponding part of the second embodiment of FIG. 5. The same reference numeral is used to denote the same functional element of the third and second embodiments, and further description thereof will be omitted.

The operation of the driver for the induction motor of the third embodiment will be described next.

In FIG. 8, the induction motor 1 is driven under the slip frequency control. Even when the induction motor 1 is forcibly driven externally by a strong (reverse) wind, for example, based on a typhoon, the voltage limit level setting means 6 and the voltage limiter 7 suppress an increase in the driving current. Even when the motor receives a wind strong so as to be reversed in its rotational direction, the lowest frequency limiter means 8 prevents the motor 1 from generating a regenerative power, which is the same as that described with reference to the second embodiment.

Figure 9:
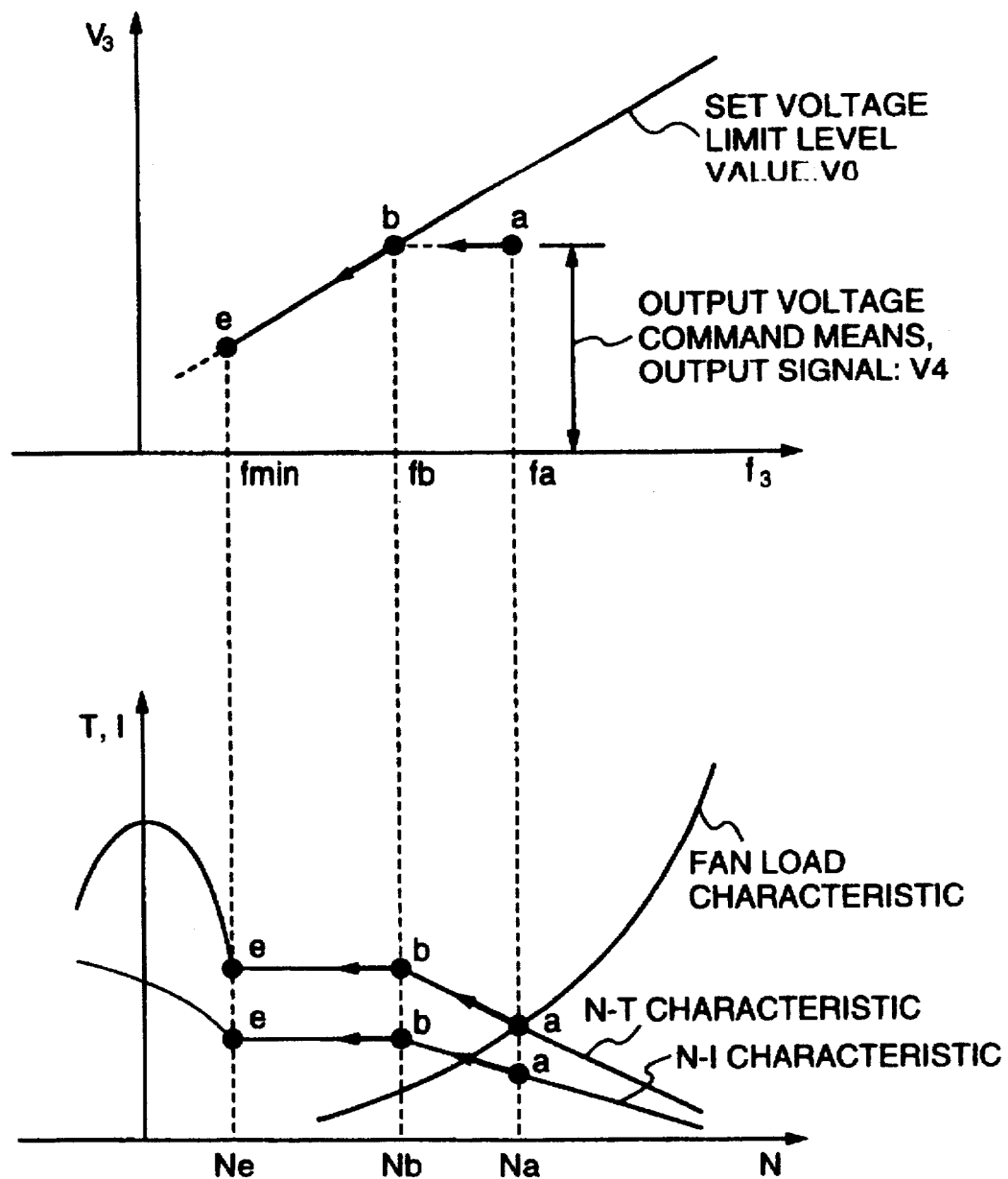
FIGS. 9 and 10 illustrate the operation of the third embodiment.

FIG. 9 shows the operation of the induction motor 1 by the second or third embodiment of FIG. 5 or FIG. 8, and especially the N-T and N-I characteristics of the motor 1.

In FIG. 9, the operation of the motor at points a and b is exactly the same as that at the points a and b of FIG. 3, mentioned above. That is, at the operational point a, the output signal $V_4$ of the output voltage command means 4 is input as an output voltage command signal $V_3$ to the invertor circuit 3 and the motor 1 is being driven on the basis of the output signal $V_4$. At the operational point b, the rotational speed of the motor 1 decreases due to a strong (reverse) wind and the voltage limit level setting means 6 and the voltage limiter means 7 start to operate. When the rotational speed of the motor 1 further decreases, the output voltage command signal $V_3$ of the invertor circuit 3 is input on the basis of the output signal $V_6$ of the voltage limit level setting means 6 to thereby suppress an increase in the driving current in the motor 1.

An operational point e of FIG. 9 is a one where as a result of the rotational speed of the motor 1 being further decreased by a stronger reverse wind, the output signal $f_5$ from the output frequency command means 5 has arrived at the lowest frequency limit level $f_{min}$. When the rotational speed further decreases, the output frequency command signal $f_3$ from the invertor circuit 3 is fixed at the lowest frequency limit level $f_{min}$ to drive the motor 1.

Thus, even when a reverse wind strong enough to reverse the rotation of the motor 1 rises, generation of a regenerative power is prevented. In a region of rotational speeds below the operational point e, the induction motor 1 is driven at a fixed frequency based on the lowest frequency limit level $f_{min}$, so that the operational efficiency of the motor 1 is low and the driving current rapidly increases as the rotational speed of the motor decreases or enters a reverse rotation region.

As the driving current of the motor 1 increases, there is a possibility that the quantity of heat produced by the motor 1 and the invertor circuit 3 increases to thereby destroy themselves. In order to prevent such breakage, large-sized semiconductor parts having large power capacities are required to be used as power parts which constitute the invertor circuit 3. When a trip mechanism operates to protect the motor and the invertor circuit from their possible overcurrents, the motor would stop each time a strong wind rises to thereby render difficult the use of the motor for the outdoor fan of the air conditioner, which is a problem similar to that occurring when the induction motor is driven under the VVVF control described with respect to the conventional technique.

In order to prevent such problem, reverse rotation limiter means 10 is provided in the present embodiment. The operation of the reverse rotation limiter means 10 will be described next. When the output signal $f_2$ from the speed sensing means 2 is below the reverse rotation limiter operation value $f_{102}$ set in the reverse rotation area by the reverse rotation limit level setting means 102, the reverse rotation limiter means 10 outputs a high level signal as a second power supply interruption signal $S_{10}$.

Figure 10:
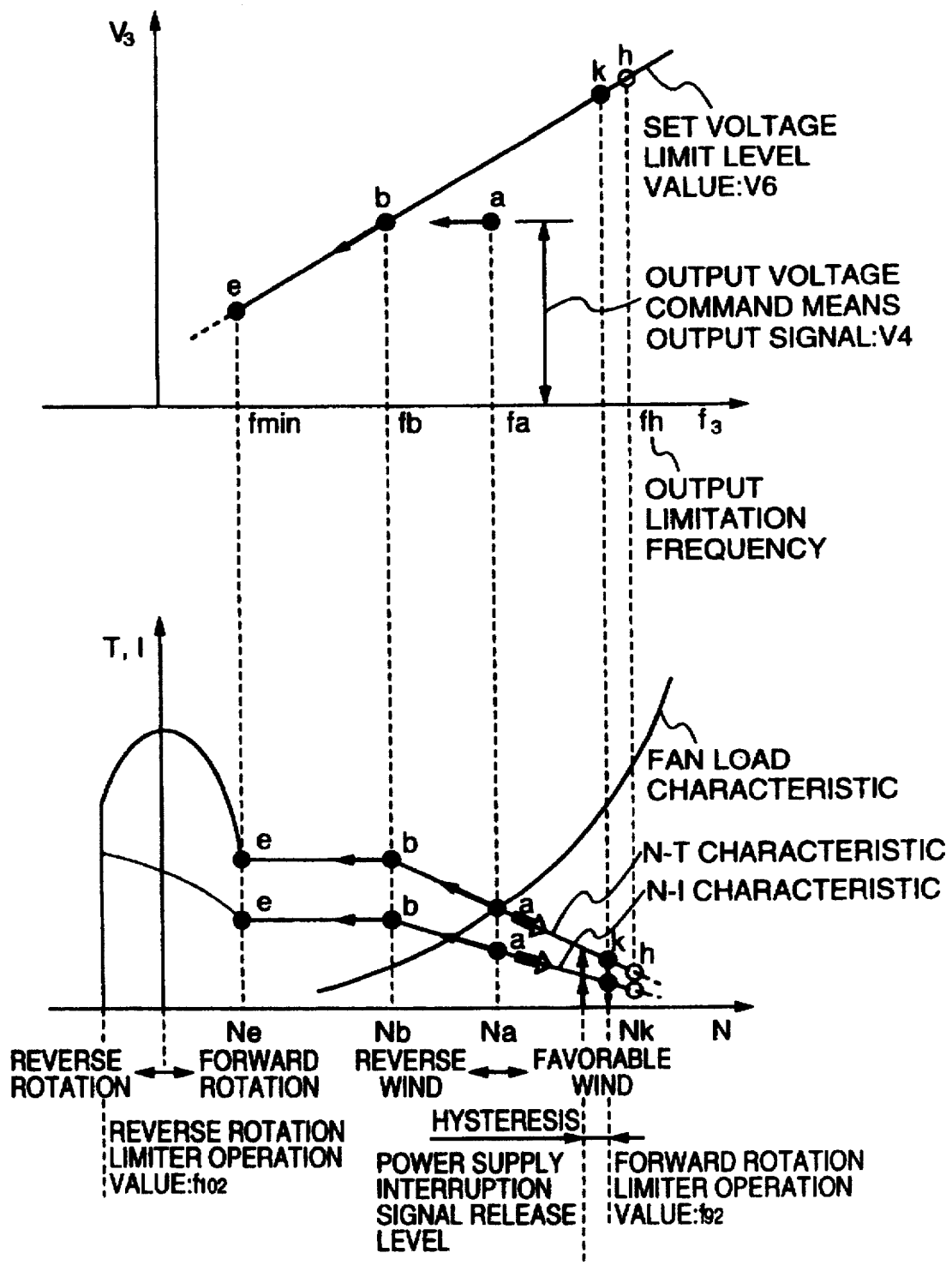

The operation of the present embodiment which includes such reverse rotation limiter means 10 will be described next. FIG. 10 illustrates the operation of the third embodiment. As described already with reference to FIG. 9, in the region where the rotational speed of the motor is below the operational point e, the motor 1 is driven at the fixed frequency $f_{min}$. Thus, the driving current of the motor rapidly increases as the rotational speed of the motor decreases.

When a very strong reverse wind rises, the rotation of the motor 1 is forcibly reversed to thereby increase its driving current. When the reverse rotation speed of the motor 1 arrives at a level corresponding to a reverse rotation limiter operation value $f_{102}$ set by the reverse rotation limit level setting means 102, the reverse rotation limiter means 10 outputs a second high level power supply interruption signal $S_{10}$.

This signal $S_{10}$ renders high a free-run command signal Fre to the invertor circuit 3 through the AND gate 12. Thus, the motor 1 is electrically released from the output from the invertor circuit 3. Since the power supply is interrupted, an increase in the driving current is prevented.

After the power supply is interrupted, the motor 1 is further driven forcibly at a greater reverse rotational speed until the reverse wind drops, but neither the driving current nor the regenerative power is generated so long as the power supply is interrupted, and no undesirable problems occur.

When, for example, a typhoon and hence the strong reverse wind drop, the motor 1, the power supply to which has been interrupted, continues to rotate due to the inertia of the fan 15 for a while and then its reverse rotational speed decreases to a level corresponding to the reverse rotation limiter operation value $F_{102}$.

At that level, a second power supply interruption signal $S_{10}$ output from the reverse rotation limiter means 10 is released to become low and power supply to the motor 1 starts again to thereby automatically return the driving of the motor to its steady state.

While in the above the operation of the motor performed when the strong wind, for example, due to a typhoon, acts on the motor 1 in a direction reverse to the driving direction of the motor 1 has been illustrated, the operation of the motor 1 performed when a strong wind acts favorably in the driving direction of the motor 1 will be described next.

When a strong favorable wind blows against the fan 15 and an external force having the same direction as the driving direction is applied to the motor 1, the motor 1 is forcibly accelerated.

As described above, the motor 1 is under slip frequency control, so that the motor 1 is driven at a frequency $f_3 = f_2 + f_{s1}$ corresponding to a rotational speed which corresponds to $f_2$.

Thus, when the motor is forcibly accelerated by a strong favorable wind, the frequency which drives the motor 1 increases.

This frequency is the output frequency of the three-phase alternating current voltage $O_1$, $O_2$ and $O_3$ output from the invertor circuit 3 and is given by the output frequency command signal $f_3$ input to the invertor circuit 3.

However, since the operational speed of the invertor circuit 3 is limited, there is a limitation to the outputtable frequency, however high the output frequency command signal $f_3$ may be increased. The limitation is referred to as an output limitation frequency $f_h$.

When the motor 1 is forcibly accelerated to be driven at high rotational speed, the output frequency command signal $f_3$ then arrives at the output limitation frequency $f_h$ of the invertor circuit 3 and then exceeds the same.

Under such conditions, the motor 1 is forcibly driven beyond a rotational speed corresponding to the output limitation frequency $f_h$ of the invertor circuit 3.

When the rotational speed of the motor rotor exceeds the rotational speed of the field system (corresponding to the output frequency of the invertor circuit 3), the motor 1 acts as a generator to generate a regenerative power in its characteristic.

Thus, when a strong favorable wind such as that described above rises and the motor 1 is excessively accelerated, the motor 1 would generate a regenerative power.

In this case, a power is conversely supplied to the invertor circuit 3 which should properly supply power to the motor 1, so that the invertor circuit 3 may be broken by its overvoltage or overcurrent, disadvantageously.

In order to prevent occurrence of such problem, forward rotation limiter means 9 is provided in the present embodiment and will be described next. When the output signal $f_2$ from the speed sensing means 2 exceeds a forward rotation limiter operation value $f_{92}$ set by the maximum frequency limit level setting means 92, the forward rotation limiter means 9 operates so as to output a high level signal as a first power supply interruption signal $S_9$.

The operation of this embodiment which includes the forward rotation limiter means 9 will be described next with reference to FIG. 10. In FIG. 10, the operational point a shows that no strong favorable wind has risen and that the motor. 1 is being rotated at a rotational speed Na in a stabilized state where the output torque of the motor 1 has balanced with the load on the fan 15.

When a strong favorable wind rises in such stabilized state and the motor is forcibly accelerated, the rotational speed of the motor arrives at a rotational speed Nk corresponding to a forward rotation limiter operation value $f_{92}$ set by the maximum frequency limit level setting means 92.

At this time, the forward rotation limiter means 9 outputs a first high-level power supply interruption signal $S_9$.

This signal renders high the free-run command signal Fre to the invertor circuit 3 through the AND gate 12. Thus, the motor 1 is electrically released from the output of the invertor circuit 3 and the power supply to the motor is interrupted.

This causes electrical currents flowing through a first and a second drive winding to be 0, so that the motor 1 neither operates as a generator nor produces a regenerative power.

The forward rotation limit level operation value $f_{92}$ is set such that the corresponding rotational speed Nk of the motor 1 does not exceed a rotational speed corresponding to the output limitation frequency $f_h$ of the invertor circuit 3. Thus, before the motor 1 arrives at the rotational speed at which the regenerative power is generated, this power supply is interrupted to thereby prevent generation of a regenerative power beforehand.

After the interruption of the power supply, the motor 1 is forcibly driven only by the strong favorable wind blowing against the fan 15. Thus, the rotational speed of the motor 1 is reduced in correspondence to the output torque lost due to the interruption of the power supply to the invertor circuit 3 compared to the rotational speed of the motor before the interruption of the power supply.

When the rotational speed of the motor 1 arrives at Nk, and the power supply is interrupted, the reduction in the motor rotational speed serves to restart the power supply to thereby cause the rotational speed of the motor to arrive at Nk to interrupt the power supply. Such operation may be iterated.

By such iteration, the startup and stoppage of the motor 1 are iterated until the strong wind, for example, due to a typhoon, drops, and a large startup current is produced intermittently to thereby cause the production of heat or noise in the motor 1 and invertor circuit 3.

In order to avoid such problem, the forward rotation limiter means 9 includes a hysteresised comparator 91. When the power supply to the motor 1 is interrupted, the power supply to the motor is kept from restarting to thereby prevent the above iteration until the rotational speed of the motor 1 drops in correspondence to the hysteresis width of the comparator 91 from Nk to thereby reach the power supply interruption signal releasing level.

When, for example, the typhoon and hence the strong favorable wind drop, the motor 1, the power supply to which has been interrupted, continues to rotate for a while due to the inertia of the fan 15. When the rotational speed of the motor decreases to a rotational speed corresponding to the power supply interruption signal releasing level, the first power supply interruption signal $S_9$ output from the forward rotation limiter means 9 is released to become low and the power supply to the motor 1 is restarted and this driving operation is automatically returned.

As described above, according to the present embodiment, when the induction motor 1 is forcibly driven externally by a strong (reverse) wind, for example, due to a typhoon, so that even after the lowest frequency limiter means 8 provided especially to prevent a regenerative power has operated, a stronger reverse wind blows against the motor, the reverse rotation limiter means 10 serves to interrupt the power supply to the motor 1 to prevent an increase in the driving current. When the strong reverse wind drops, the reverse rotation limiter means 10 restart the power supply to the motor 1, so that the quantity of heat produced by the motor 1 and the invertor circuit 3 is small and small-sized power semiconductor elements having small power capacities are employable as parts which constitute the invertor circuit. The driver for the induction motor is realized which is optimal for the driving of the outdoor fan of the air conditioner which is free from a stop due to overcurrent trip which would otherwise occur each time such strong wind rises.

A driver for the induction motor is realized in which even when the motor 1 is forcibly driven externally by a strong (favorable) wind, for example, due to a typhoon, and excessively accelerated, the forward rotation limiter means 9 interrupts the power supply to the motor 1 to thereby prevent the generation of a regenerative power before the rotational speed of the motor 1 exceeds a rotational speed corresponding to the output limitation frequency $f_h$ from the invertor circuit 3 and hence the driver is free from breakage which would otherwise occur due to reversal supply of power to the invertor circuit 3.

A driver for the induction motor is realized in which even if the rotational speed of the motor 1 decreases when the forward rotation limiter means 9 acts to interrupt the power supply to the motor 1, the use of the hysteresised comparator 91 which constitutes part of the forward rotation limiter means 9 does not cause the motor 1 to repeat its startup and stoppage alternately, and hence no startup current is intermittently generated to thereby prevent the generation of heat/noise in the motor 1 and the invertor 3 beforehand and hence to interrupt the power supply to the motor in a stabilized manner.

The driver for the induction motor is realized which when the strong favorable wind drops, restarts the power supply to the motor 1 and hence is optimal to driving the outdoor fan of the air conditioner which is free from tripping and stopping each time a strong wind rises.

(Embodiment 4)

Figure 11:
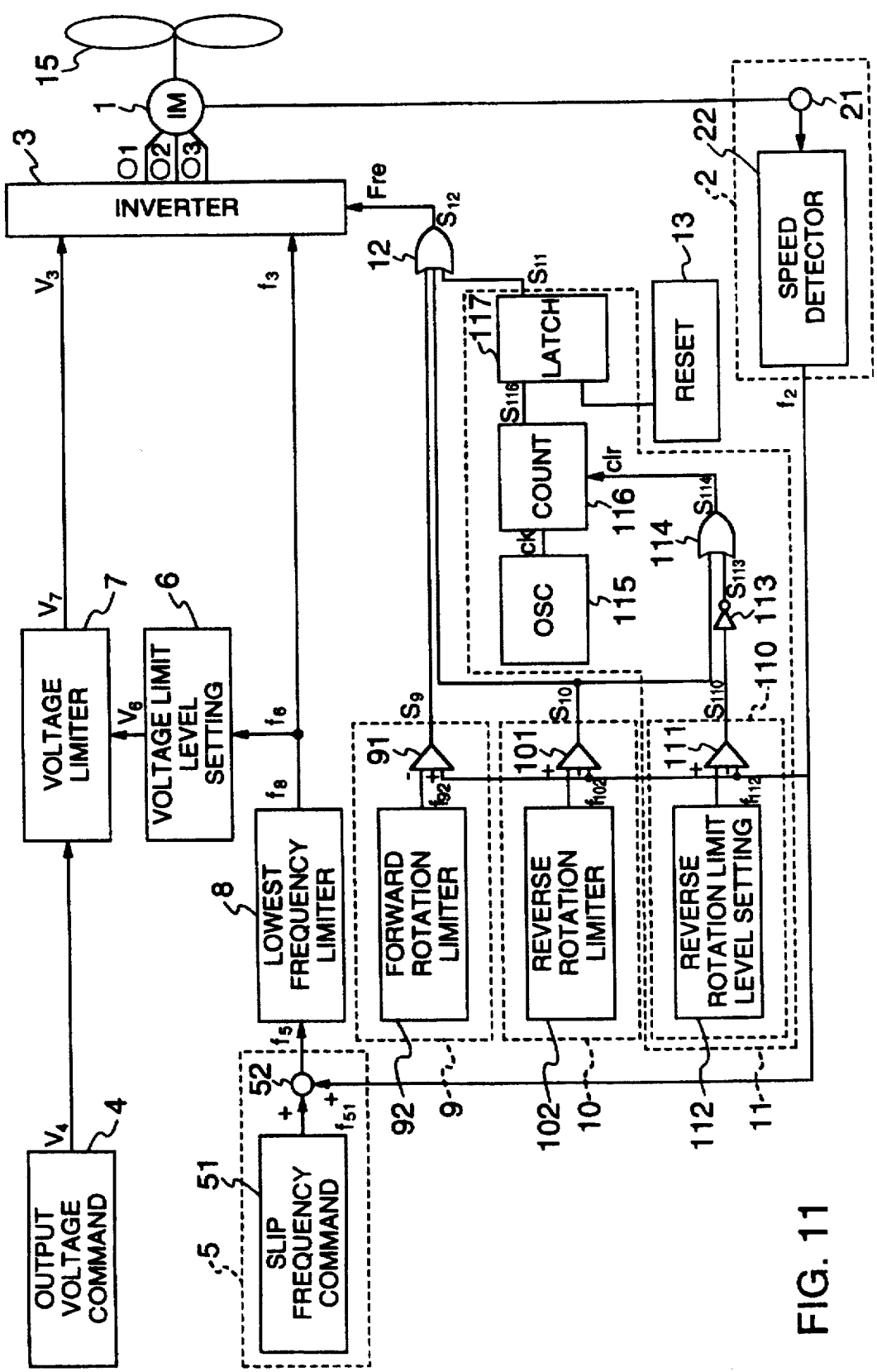
FIG. 11 shows a fourth embodiment of the driver for an induction motor according to the present invention.

FIG. 11 shows a fourth embodiment of the driver for an induction motor according to the present invention. In FIG. 11, reference numeral 110 denotes low-speed abnormality detection means which includes low-speed abnormality detection level setting means 112 and a comparator 111 which compares an output signal $f_{112}$ from the low-speed abnormality detection level setting means 112 and an output signal $f_2$ from the speed sensing means 2. When the output signal $f_2$ is below the output signal $f_{112}$, the comparator 111 outputs a high level signal as a low speed abnormality signal $S_{110}$.

The low-speed abnormality signal $S_{110}$ output from the low-speed abnormality detection means 110 is input to an invertor 113 which inverts the logic. The output signal $S_{113}$ from the invertor 113 and a second power supply interruption signal $S_{10}$ from the reverse rotation limiter means 10 are input to an AND gate 114 which ANDs those inputs.

Reference numeral 116 denotes a counter which receives the output from an oscillator 115 as a clock signal ck and also receives the output signal $S_{114}$ from AND gate 114 as a clear signal clr.

Reference numeral 117 denotes a latch which is set by an output signal $S_{116}$ from the counter 116 and reset by an output from a reset circuit 13.

The respective elements 110–117 constitute low-speed overload detection means 11 which outputs a high level signal from the latch 117 as a third power supply interruption signal $S_{11}$.

An AND gate 12 performs an ANDing operation on a first power supply interruption signal S9 from the positive rotation limiter means 9, a second power supply interruption signal $S_{10}$ output from the reverse rotation limiter means 10, and a third power supply interruption signal $S_{11}$ output from the low-speed overload detection means 11 with the output signal $S_{12}$ from the AND gate 12 being input as a free-run command signal Fre to the invertor circuit 3.

The remaining structural portion of the embodiment is similar to those corresponding portions of the third embodiment of FIG. 8. The same reference numeral is used to denote the same functional element of the third and fourth embodiments and further description thereof will be omitted.

The operation of the driver for the induction motor of the fourth embodiment, thus constructed, will be described next.

Figure 12:
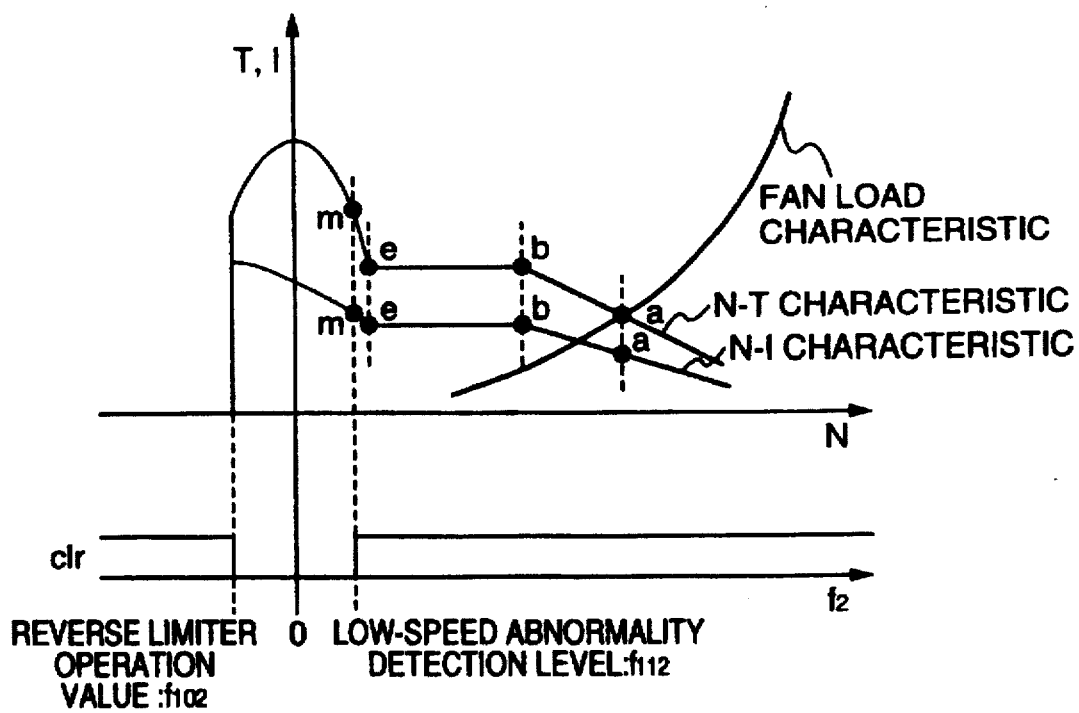
FIGS. 12 and 13 illustrate the operation of the fourth embodiment.

FIG. 12 illustrates the operation of the fourth embodiment of FIG. 11. The operations at points a, b and e of FIG. 12 are exactly the same as those at the operational points a, b and e of FIG. 9 or 10, and further description thereof will be omitted.

In FIG. 12, when a strong (reverse) wind, for example, based on a typhoon, blows against the fan 15 and the induction motor 1 is forcibly driven, the operational point of the motor 1 moves from the point a through the point b to the point e.

At this time, the motor 1 is driven at a fixed frequency $f_{min}$ by the action of the lowest-frequency limiter means 8, so that when a stronger reverse wind blows, the driving current rapidly increases, as described above.

However, when the reverse wind blowing against the fan 15 is not so strong to operate the reverse rotation limiter means 10 to thereby interrupt the power supply to the motor 1, or when the rotor of the motor 1 is forcibly locked, the motor 1 may continue to be driven by a large driving current in a region of rotational speeds lower than the vicinity of the operational point e.

When such situation continues for a long time, there is a possibility that the motor 1 and the invertor circuit 3 will be overheated. In order to avoid such undesirable situation, low-speed overload detection means 11 is provided in the present embodiment. The operation of this means 11 will be described next.

In the low-speed overload detection means 11, first, when the output signal $f_2$ from the speed sensing means 2 is below the output signal $f_{112}$ from the low-speed abnormality detection level setting means 112, first, a high-level low-speed abnormality signal $S_{110}$ from the low-speed abnormality detection means 110 and the second power supply interruption signal $S_{10}$ output from the reverse rotation limiter means 10 are processed by a logic composed of elements 113 and 114. Thus, AND gate 114 outputs a low level output signal $S_{114}$ when the rotational speed of the motor 1 is below a rotational speed corresponding to the output signal $f_{112}$ from the low-speed abnormality detection level setting means 112 and before the rotational speed of the motor arrives at a rotational speed corresponding to the reverse rotation limiter operation value $f_{102}$ which operates the reverse rotation limiter means 10.

That is, while the motor 1 is being driven by a large driving current in a region of rotational speeds of less than the rotational speed corresponding to the signal $f_{112}$ set in the vicinity of the operational point e of FIG. 12, the output signal $S_{114}$ is arranged to be low.

Figure 13:
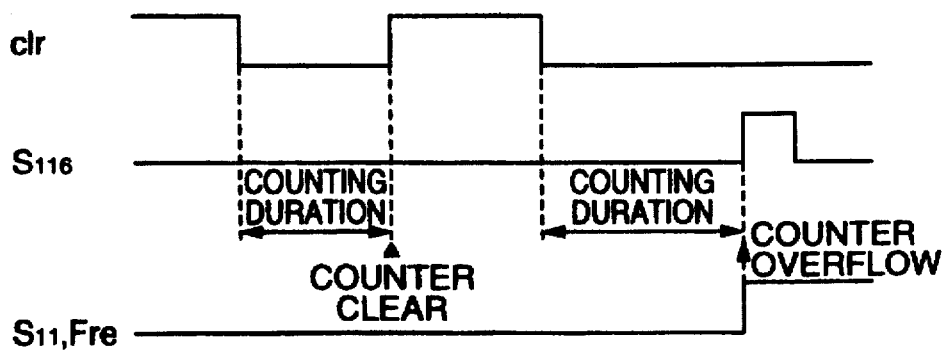
Figure 14:
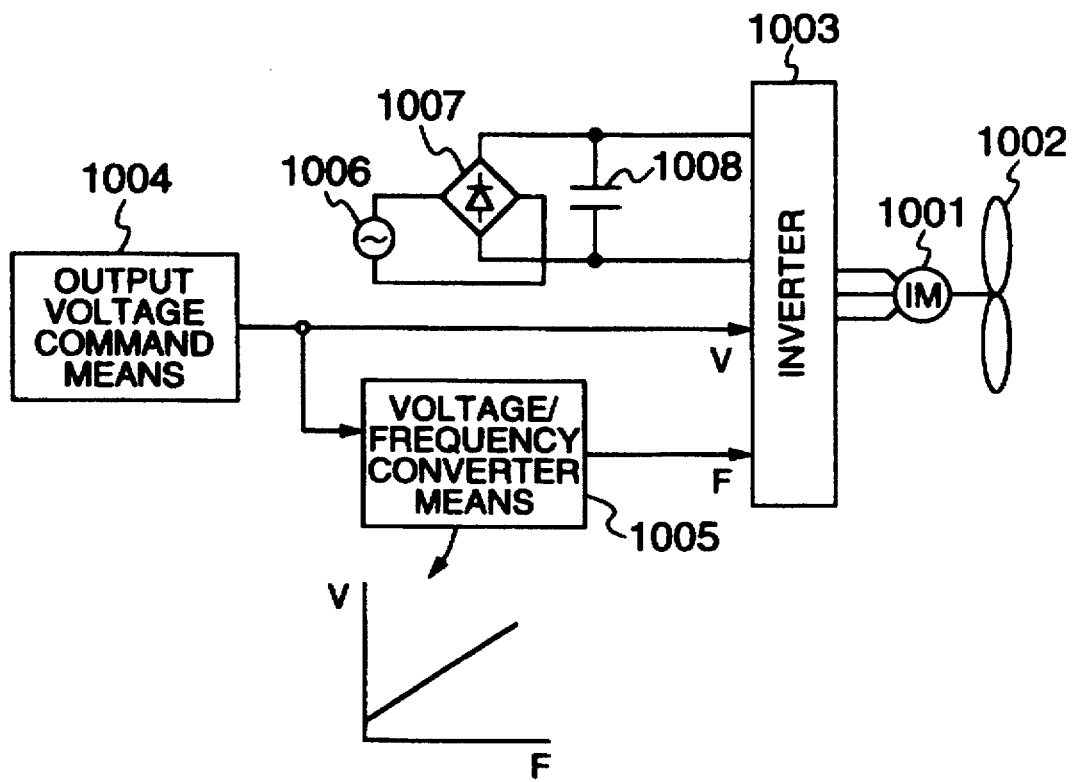
FIG. 14 shows one example of a conventional driver for an induction motor.

The output signal $S_{114}$ is a clear signal clr for the counter 116. FIG. 13 illustrates the post-processing operation of the low-speed overload detection means 11, which will be described next. The counter 116 counts clock signals ck output from an oscillator 115 while the clear signal clr is low, and clears the counts in the counter 116 when the clear signal clr becomes high and restarts its counting operation from 0.

When the output $S_{116}$ from the counter 116 overflows as the result of counting clock signals ck, its output signal $S_{116}$ becomes high.

When the counter 116 overflows and its output signal $S_{116}$ becomes high, and the latch 117 is set and its output signal $S_{117}$ becomes high.

The high level signal from the latch 117 is output as a third power supply interruption signal $S_{11}$ from the low-speed overload detection means 11.

When the state in which the motor 1 is driven with a large driving current in a region of rotational speeds lower than a rotational speed corresponding to the signal $f_{112}$ set in the vicinity of the operational point e of FIG. 12 continues for so long a time that the counter 116 overflows, the low-speed overload detection circuit 11 outputs a third high-level power supply interruption signal $S_{11}$ by combining the pre- and post-processing operations.

Once the third power supply interruption signal $S_{11}$ becomes high, it is latched by the latch 117, and the high level of the third power supply interruption signal $S_{11}$ is maintained until the latch 117 receives a reset signal from the reset circuit 13.

The operation of the embodiment which includes such low-speed overload detection means 11 will be described next. When the rotational speed of the motor 1 arrives at the vicinity of the operational point e of FIG. 12 due to a strong reverse wind and the motor is driven in a region of low rotational speeds below a rotational speed corresponding to the output signal $f_{112}$ from the low-speed abnormality detection level setting means 112, the counter 116 starts to count clock signals ck.

When the counter 116 then overflows, the low-speed overload detection circuit 11 outputs a third high-level power supply interruption signal $S_{11}$. This signal causes the free-run command signal Fre to the invertor circuit 3 to be high through the AND gate 12.

The free-run command signal Fre is latched by the latch 117 and maintained until the reset circuit 13 outputs a reset signal in response to the re-turning on of the power supply (not shown) or a command from a controller of a device body (for example, the outdoor device of the air conditioner) on which the motor 1 is mounted.

Thus, until the reset circuit 13 outputs the reset signal, the motor 1 is electrically released from the output of the invertor circuit 3 and not supplied with power to thereby prevent the overheating of the motor 1 and the invertor 3.

The time duration in which the counter 116 overflows is freely settable by the output frequency of the oscillator 115 and the number of flip-flop stages which constitute the counter 116. Preferably, it is set to be a time duration, for example, of about 10–30 seconds in which the motor 1 is not stopped so frequently by an external disturbance such as the startup or an instantaneous reverse wind.

While, as shown in FIG. 12, in the present embodiment, the low-speed abnormality detection level $f_{112}$ is set so as to be in the region of rotational speeds lower than the operational point r, the low-speed abnormality detection level $f_{112}$ may be set at the operational point e or in a region of rotational speeds higher than the operational point e or in the region of reverse rotational speeds in a range where the rotational speed does not reach the reverse rotation limiter operational point $f_{102}$.

That is, the output signal $f_{112}$ from the low-speed abnormality detection level setting means 112 may be set such that an increase in the driving current of the motor 1 is suppressed at a degree where the motor 1 and the invertor circuit 3 and hence the whole machine (for example, the outdoor machine of the air conditioner) including the motor 1 and the invertor circuit 3 are not overheated.

When the rotational speed of the motor 1 has past through the region where the low-speed overload detection means 11 operates, that is, the region of rotational speeds lower than the vicinity of the operational point e before the counter 116 overflows, the counter 116 is cleared with a clear signal clr at that time, so that power supply to the motor 1 is not interrupted by the low-speed overload detection means 11.

For example, when the rotational speed of the motor passes rapidly through the above region and arrives at the region where the reverse rotation limiter means 10 operates, the power supply to the motor 1 is interrupted by the reverse rotation limiter means 10, as described with respect to the third embodiment, and if the strong reverse wind drops, the motor returns automatically to its steady state.

As described above, according to the present embodiment, a driver for the induction motor is realized in which when a reverse wind blowing against the fan 15 is not so strong to operate the reverse rotation limiter means 10 to thereby interrupt the power supply to the induction motor 1, or when the rotor of the motor 1 is forcibly locked, the low-speed overload detection means 11 prevents long-time driving of the motor 1 with a large driving current in the region of rotational speeds lower than the vicinity of the operation point e to thereby prevent the motor 1 and the invertor 3 from being overheated.

As described above, according to the present invention, first, a driver for the induction motor is realized in which the voltage limit level setting means and the voltage limiter means serve to suppress an increase in the driving current even when the motor is forcibly driven externally by a strong reverse wind, for example, based on a typhoon, and hence the quantity of heat produced by the motor and the invertor circuit is small, and small power semiconductor elements having small power capacities may be used as parts which constitute the invertor circuit, and the driver is free from a stop due to an overcurrent trip which would otherwise occur each time a strong wind rises. The driver is optimal to the drive of the outdoor fan of the air conditioner.

Second, a driver for the induction motor is realized in which even when the induction motor receives a strong wind such as reverses the rotational direction thereof, the motor is prevented from generating a regenerative power because of the provision of the lowest frequency limiter means to thereby protect the invertor circuit from breakage which would otherwise be caused by reverse supply of power to the invertor circuit.

Third, a driver for the induction motor is realized which when a stronger reverse wind blows against the motor after the lowest frequency limiter means provided especially to prevent a regenerative power has operated, the reverse rotation limiter means serves to interrupt the power supply to the motor to prevent an increase in the driving current. When the stronger reverse wind drops, the reverse rotation limiter means restart the power supply to the motor, so that the quantity of heat produced by the motor and the invertor circuit is small and small-sized power semiconductor elements having small power capacities are employable as parts which constitute the invertor circuit. The driver is optimal for the driving of the outdoor fan of the air conditioner which is free from a stop due to overcurrent trip which would otherwise occur each time such strong wind rises.

A driver for the induction motor is realized in which even when the motor is forcibly driven externally by a strong (favorable) wind, for example, due to a typhoon, and excessively accelerated, the forward rotation limiter means 9 interrupts the power supply to the motor to thereby prevent the generation of a regenerative power before the rotational speed of the motor exceeds a rotational speed corresponding to the output limitation frequency $f_h$ from the invertor circuit and hence the driver is free from breakage which would otherwise occur due to reversal supply of power to the invertor circuit.

A driver for the induction motor is realized in which even if the rotational speed of the motor 1 decreases when the forward rotation limiter means acts to interrupt the power supply to the motor 1, the use of the hysteresised comparator which constitutes part of the forward rotation limiter means does not cause the motor to repeat its startup and stoppage alternately, and hence no startup current is intermittently generated to thereby prevent the generation of heat/noise in the motor and the invertor circuit beforehand and hence to interrupt the power supply to the motor in a stabilized manner.

A driver for the induction motor is realized which when the strong favorable wind drops, restarts the power supply to the motor and hence is optimal to driving the outdoor fan of the air conditioner which is free from tripping and stopping each time a strong wind rises.

Fourth, a driver for the induction motor is realized in which when a reverse wind blowing against the fan is not so strong to operate the reverse rotation limiter means to thereby interrupt the power supply to the induction motor, or when the rotor of the motor is forcibly locked, the low-speed overload detection means prevents the motor and the invertor circuit from being overheated even when the motor is driven for a long time with a large driving current in the region of low rotational speeds.

While in the respective embodiments of the invention the output of the invertor circuit and the induction motor have been illustrated as being of the three-phase type, they are not necessarily so, but may be, for example, of a single-phase type.

While in the above respective embodiments the term "circuit" has been used to denote some elements of each of the embodiments, these elements are not necessarily hardware such as a circuit, but may be realized, for example, by software having a function similar to that of the hardware.

What is claimed is:

1. A driver for an induction motor comprising:

speed sensing means for sensing a rotational speed of the induction motor;

an invertor circuit for supplying power to the induction motor by an alternating current voltage based on an output voltage command signal and an output frequency command signal;

output voltage command means for giving the output voltage command signal to said invertor circuit;

output frequency command means for applying, as the output frequency command signal to said invertor circuit, a sum of a predetermined slip frequency and a frequency signal depending on the rotational speed of the induction motor and output from said speed sensing means, the driver being driven under slip frequency control, voltage limit level setting means for setting a upper limit value of an output voltage from said invertor circuit in accordance with an output signal from said output frequency command means or an output signal from said speed sensing means; and voltage limiter means for limiting the output signal from said output voltage command means in accordance with a set value set by said voltage limit level setting means to limit the upper limit of the output voltage from said invertor circuit, wherein a set level for the upper limit of the output voltage from said invertor circuit is changed in correspondence to a change in the output frequency from said invertor circuit.

2. A driver for an induction motor comprising:

speed sensing means for sensing a rotational speed of the induction motor;

an invertor circuit for supplying power to the induction motor by an alternating current voltage based on an output voltage command signal and an output frequency command signal;

output voltage command means for giving the output voltage command signal to said invertor circuit;

output frequency command means for applying, as the output frequency command signal to said invertor circuit, a sum of a predetermined slip frequency and a frequency signal depending on the rotational speed of the induction motor and output from said speed sensing means, the driver being driven under slip frequency control, voltage limit level setting means for setting a upper limit value of an output voltage from said invertor circuit in accordance with an output signal from said output frequency command means or an output signal from said speed sensing means;

voltage limiter means for limiting the output signal from said output voltage command means in accordance with a set value set by said voltage limit level setting means to limit the upper limit of the output voltage from said invertor circuit;

lowest-frequency limiter means for limiting the output signal from said output frequency command means such that the lower limit of the output frequency from said invertor circuit is not less than a preset lowest frequency; and wherein a set level for the upper limit of the output voltage from said invertor circuit is changed in correspondence to a change in the output frequency from said invertor circuit, and the lowest frequency becomes the output frequency from said invertor circuit when the output frequency from said invertor circuit decreases to the lowest frequency of said lowest frequency limiter means.

3. A driver for an induction motor comprising:

speed sensing means for sensing a rotational speed of the induction motor;

an invertor circuit for supplying power to the induction motor by an alternating current voltage based on an output voltage command signal and an output frequency command signal;

output voltage command means for giving the output voltage command signal to said invertor circuit;

output frequency command means for applying, as the output frequency command signal to said invertor circuit, a sum of a predetermined slip frequency and a frequency signal depending on the rotational speed of the induction motor and output from said speed sensing means, the driver being driven under slip frequency control, voltage limit level setting means for setting a upper limit value of an output voltage from said invertor circuit in accordance with an output signal from said output frequency command means or an output signal from said speed sensing means;

voltage limiter means for limiting the output signal from said output voltage command means in accordance with a set value set by said voltage limit level setting means to limit the upper limit of the output voltage from said invertor circuit;

lowest-frequency limiter means for limiting the output signal from said output frequency command means such that the lower limit of the output frequency from said invertor circuit is not less than a preset lowest frequency;

forward rotation limiter means for sensing whether the output frequency from said invertor circuit has reached a preset maximum frequency limit level and if so, for outputting a first power supply interruption signal; and reverse rotation limiter means for detecting whether the reverse rotation speed of the induction motor has reached a preset reverse rotation limit level and if so, for outputting a second power supply interruption signal;

wherein a set level for the upper limit of the output voltage from said invertor circuit is changed in correspondence to a change in the output frequency from said invertor circuit, and the lowest frequency becomes the output frequency from said invertor circuit when the output frequency from said invertor circuit decreases to the lowest frequency of said lowest frequency limiter means, and power supply to the induction motor is interrupted when either said forward rotation limiter means outputs the first power supply interruption signal or said reverse rotation limiter means outputs the second power supply interruption signal.

4. A driver for an induction motor comprising:

speed sensing means for sensing a rotational speed of the induction motor;

an invertor circuit for supplying power to the induction motor by an alternating current voltage based on an output voltage command signal and an output frequency command signal;

output voltage command means for giving the output voltage command signal to said invertor circuit;

output frequency command means for applying, as the output frequency command signal to said invertor circuit, a sum of a predetermined slip frequency and a frequency signal depending on the rotational speed of the induction motor and output from said speed sensing means, the driver being driven under slip frequency control, voltage limit level setting means for setting a upper limit value of an output voltage from said invertor circuit in accordance with an output signal from said output frequency command means or an output signal from said speed sensing means;

voltage limiter means for limiting the output signal from said output voltage command means in accordance with a set value set by said voltage limit level setting means to limit the upper limit of the output voltage from said invertor circuit;

lowest-frequency limiter means for limiting the output signal from said output frequency command means such that the lower limit of the output frequency from said invertor circuit is not less than a preset lowest frequency;

forward rotation limiter means for sensing whether the output frequency from said invertor circuit has reached a preset maximum frequency limit level and if so, for outputting a first power supply interruption signal; and reverse rotation limiter means for detecting whether the reverse rotation speed of the induction motor has reached a preset reverse rotation limit level and if so, for outputting a second power supply interruption signal;

low-speed abnormality detection means for detecting whether the rotational speed of the induction motor is below a preset low-speed abnormality detection level and if so, for outputting a low-speed abnormality signal; and low-speed overload detection means including said low-speed abnormality detection means for latching and outputting a third power supply interruption signal when a state in which said low-speed abnormality detection means outputs the low-speed abnormality signal and said reverse rotation limiter means outputs no second power supply interruption signal continues for a predetermined time duration;

wherein a set level for the upper limit of the output voltage from said invertor circuit is changed in correspondence to a change in the output frequency from said invertor circuit, and wherein the lowest frequency becomes the output frequency from said invertor circuit when the output frequency from said invertor circuit decreases to the lowest frequency of said lowest frequency limiter means, and wherein power supply to the induction motor is interrupted when said forward rotation limiter means outputs the first power supply interruption signal or said reverse rotation limiter means outputs the second power supply interruption signal, or when said low-speed overload detection means outputs the third power supply interruption signal.

5. A driver for an induction motor according to claim 3, wherein said foreword rotation limiter means comprises hysteresis means for outputting a first power supply interruption signal when the output frequency from said invertor circuit arrives at a preset maximum frequency limit level, and for maintaining the output of the first power supply interruption signal from the time when said forward rotation limiter means outputs the first power supply interruption signal to the time when the output frequency from said invertor circuit reaches a power supply interruption signal releasing level of a frequency somewhat lower than the maximum frequency limit level, and for releasing the output of the first power supply interruption signal when the output frequency from said invertor circuit reaches the power supply interruption signal releasing level, and for outputting no first power supply interruption signal until the output frequency from said invertor circuit reaches the maximum frequency limit level.

6. A driver for an induction motor according to claim 4, wherein said foreword rotation limiter means comprises hysteresis means for outputting a first power supply interruption signal when the output frequency from said invertor circuit arrives at a preset maximum frequency limit level, and for maintaining the output of the first power supply interruption signal from the time when said forward rotation limiter means outputs the first power supply interruption signal to the time when the output frequency from said invertor circuit reaches a power supply interruption signal releasing level of a frequency somewhat lower than the maximum frequency limit level, and for releasing the output of the first power supply interruption signal when the output frequency from said invertor circuit reaches the power supply interruption signal releasing level, and for outputting no first power supply interruption signal until the output frequency from said invertor circuit reaches the maximum frequency limit level.

\* \* \* \* \*